Oct. 7, 1930.　　　　　D. T. WILLIAMS　　　　　1,777,950
DISTILLATION APPARATUS
Filed July 12, 1924　　　2 Sheets-Sheet 1

INVENTOR
David T. Williams
BY
Emery, Booth, Janney & Varney
ATTORNEYS

Oct. 7, 1930.  D. T. WILLIAMS  1,777,950
DISTILLATION APPARATUS
Filed July 12, 1924   2 Sheets-Sheet 2
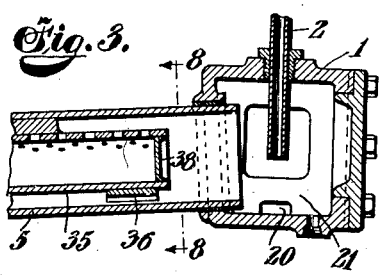
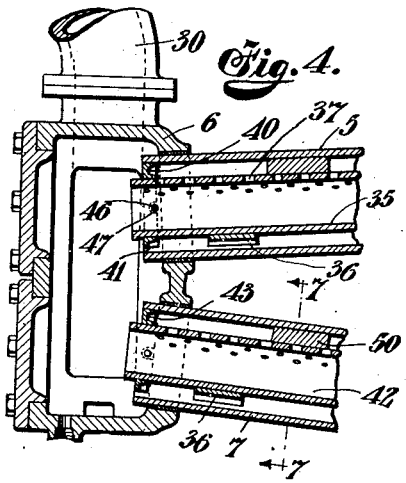
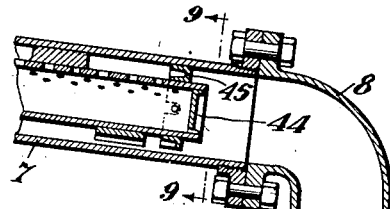
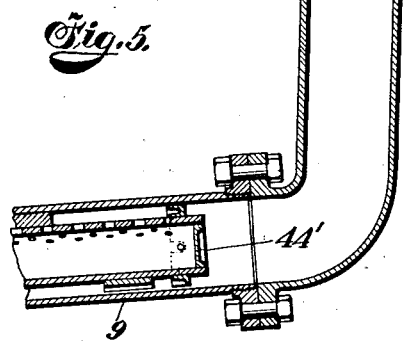
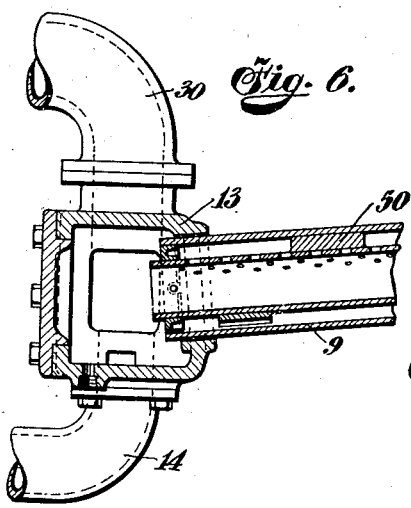
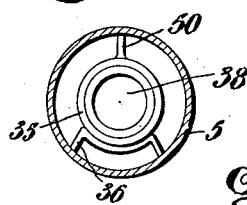
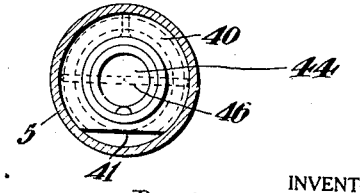
INVENTOR
David T. Williams
BY
ATTORNEYS Patented Oct. 7, 1930

1,777,950

UNITED STATES PATENT OFFICE

DAVID T. WILLIAMS, OF PATERSON, NEW JERSEY, ASSIGNOR TO PETROLEUM DERIVATIVES INCORPORATED OF MAINE, OF NEW YORK, N. Y., A CORPORATION OF MAINE

DISTILLATION APPARATUS

Application filed July 12, 1924. Serial No. 725,533.

This invention relates to distillation apparatus and pertains more particularly to an apparatus for the fractional distillation of hydrocarbon oils.

It is an object of the present invention to provide an apparatus in which fractional distillation of hydrocarbon oils may be carried on as a continuous process and in which distillates of different boiling points may be taken off separately and simultaneously, and it is a further object to provide an apparatus in which the evolved vapors may be separated rapidly and efficiently from the remainder of unvaporized liquid which remains in the still for further treatment.

Other objects and advantages of the invention will appear hereinafter.

A preferred embodiment of the invention selected for purposes of illustration is shown in the accompanying drawings, in which, Figure 1 is a side elevation of the apparatus, certain parts of the furnace walls being broken away to better disclose the construction of the apparatus.

Figure 3 is an enlarged sectional view of the top header.

Figure 4 is an enlarged sectional view of one of the main headers.

Figure 5 is an enlarged sectional view of one of the connecting elbows.

Figure 6 is an enlarged sectional view of the bottom header.

Figure 7 is an enlarged sectional view taken on the line 7—7 of Figure 4.

Figure 1:
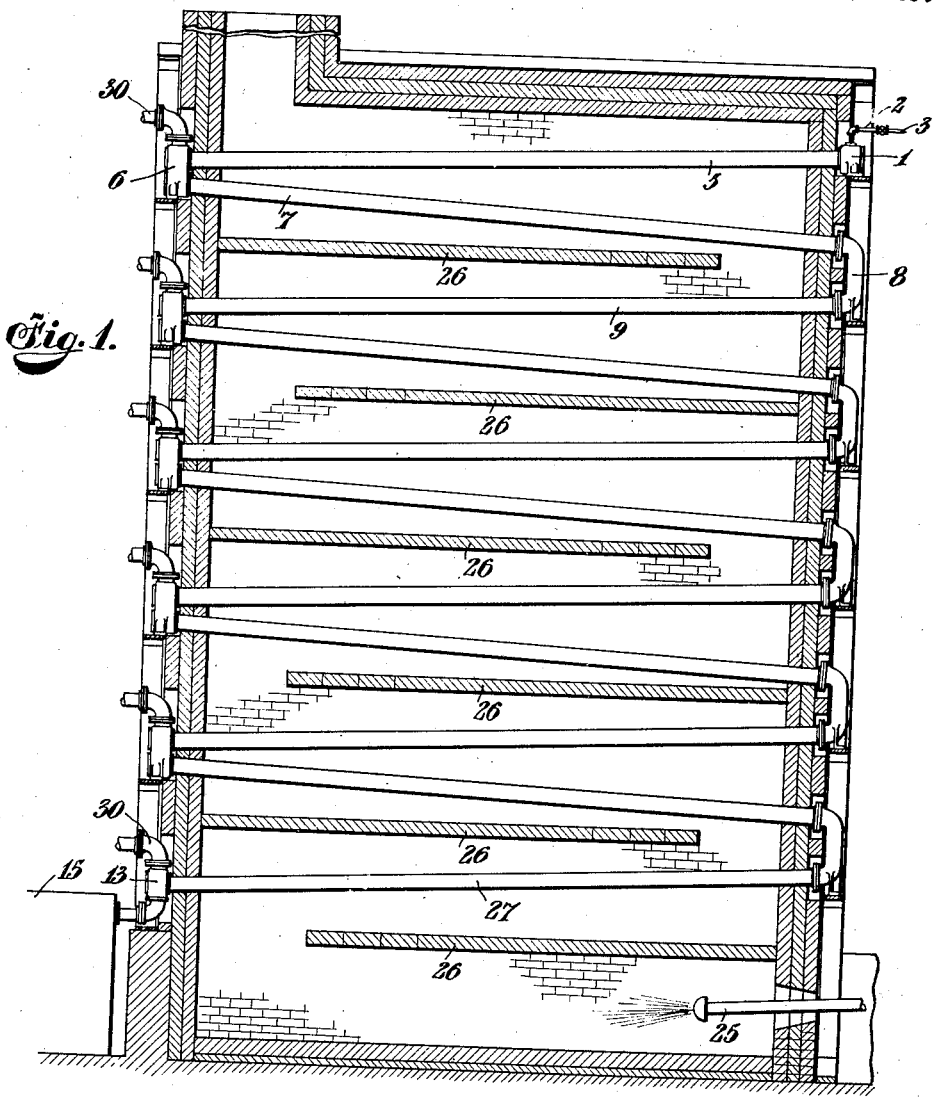

Figures 8 and 9 are enlarged sectional views taken on the lines 8—8 and 9—9 of Figures 3 and 5 respectively.

Referring to the drawings, a header 1 is provided which may be termed a top header into which oil to be treated is admitted through the passage 2, the rate of flow of oil thereto being governed by a suitable valve 3. The incoming oil from the passage 2 drops to the bottom of the header and flows into the conduit 5 which enters one side of the header. The oil travels down through the conduit 5 under the influence of gravity, the conduit 5 being inclined at such an angle as to provide a reasonably rapid rate of flow therethrough.

Neglecting for the moment the effect of heat on the oil and the course of the vapors evolved by the application thereof, the liquid oil will flow through the conduit 5 and will pass therefrom into the bottom of one of the main headers 6, where it again forms a stream of oil in the conduit 7 similar to that formed in the conduit 5. Flowing through the conduit 7 under the influence of gravity as before, the liquid oil will pass from the conduit 7 through the connecting elbow 8 into the conduit 9 again forming a stream therein as before. This process may be repeated through a plurality of successive conduits and headers, as illustrated, until it reaches the bottom header 13 which may be connected by a conduit 14 to a residue receiver 15.

Figure 2:
Figure 2 is a top plan view of the apparatus.

As will be seen by reference to Figure 2, the header 1 consists of a plurality of sections $a$, $b$, $c$ and $d$, each of which is provided with one of the inlet pipes 2 previously described. The sections of the header may be interconnected by means of slots 20 formed in the partitions 21 separating the sections in order that the incoming oil may flow freely from one section to another. Each of the sections of the header may also be provided with one of the inclined conduits 5 previously described through which the incoming oil is delivered from the header for treatment. Any convenient number of conduits 5 may be provided, the number being dependent chiefly on the quantity of oil which it is desired to treat. It is possible to use a single conduit, although the plurality of conduits illustrated is deemed desirable because the greater surface presented to the heat provides more efficient operation.

In the operation of the apparatus the flow of oil through the conduits is preferably adjusted in such manner that a relatively small stream or film of oil is kept flowing continuously in the bottom of the conduits. Heat is applied from a heating unit 25 arranged at the bottom of the still and baffles 26 are provided to guide the hot gases upwardly over the conduits in such manner that the greatest degree of heat will be applied at the bottom of the still, as at the conduits 27, and a progressively decreasing degree of heat will be applied upwardly throughout the still so that the incoming oil is subjected in the conduits 5 to the least degree of heat, and the degree of heat progressively increases as the oil flows downwardly through the conduits toward the residue receiver 15.

Each of the main headers, such as 6 and the bottom header 13, is provided with a conduit 30 through which the vapors evolved by the application of heat may be withdrawn from the system. The vapors may be withdrawn by a suitable vacuum means not shown, which withdraws the vapors through separating towers, condensers, etc., and at the same time maintains a high degree of vacuum throughout the entire system.

The vacuum maintained may vary somewhat but in general it is desirable to maintain as high a degree of vacuum as is practicable. It is possible to operate with some degree of success with an absolute pressure as high as 100 millimeters of mercury, but it is preferable to operate with an absolute pressure less than this, as for instance, at an absolute pressure of 25 millimeters or even less, as for instance, 5 or 10 millimeters under favorable conditions.

Distillation operations under extremely high vacuums are sometimes attended by serious practical difficulties, although the theoretical advantage of high vacuum distillation is very great in that the oils may be vaporized with a very much less degree of heat, thereby reducing the amount of decomposition which takes place. It has been observed, however, that under very high vacuums the oils being treated have a tendency to froth and foam, and the vapors evolved become imprisoned in a vast number of small bubbles, the walls of which are formed by unvaporized oil having a higher boiling point than the vapors forming the inside of the bubbles. If this froth and foam is not broken up and is allowed to be carried over into the towers, the distillate is contaminated by the unvaporized oils which have been carried over mechanically therewith.

In a tubular still, such as the present still, this difficulty is minimized due to the fact that only a small quantity of oil is subjected to heat at any given point, and the film being relatively thin, the vapors separate more readily from the liquid than in a tank for instance in which the oil is maintained in considerable volume. In addition, since the top walls of the tube have a tendency to be slightly hotter than the bottom of the tube where the liquid is absorbing heat, there is a tendency to break up the froth or foam by the application of the greater degree of heat thereto as the bubbles are formed.

In the present apparatus, however, positive means have been provided to break up the froth and foam and to separate the evolved vapors from the oil being treated substantially at the point at which the vapors are formed, the vapors being conducted therefrom without contact with the hot unvaporized oil.

Referring to the detail sectional views of the drawing, a conduit 35 is mounted within the conduit 5 and is supported therein by means of supporting bridge members 36 which may be arranged at intervals along the conduits. The conduit 35 extends substantially from the inlet end of the conduit 5 to the outlet end thereof and is provided throughout its extent with a plurality of relatively small perforations 37 which are arranged along the upper side thereof. The end of the conduit 35 corresponding to the inlet end of the conduit 5 may be fitted with a plug 38 which serves to prevent the liquid oil flowing into the conduit 5 from entering the conduit 35. At the opposite end of the conduits, the conduit 35 is open for the free escape of vapors, but a plug 40 may be provided to surround the end of the conduit 5 to somewhat restrict the passage of vapor from the conduit 5. The plug 40 may be cut away as at 41 on its lower edge in order to permit the free flow of liquid therethrough though the flow of vapor is restricted. As will be apparent, the provision of the plug 40 aids in causing the evolved vapors to pass immediately into the inner conduit since the restriction imposed by the plug 40 leaves only the inner conduit as a means of escape.

In the embodiment of the apparatus illustrated, each of the main headers, such as 6, is intended to serve as an exit for vapors from both of the sets of conduits entering it. Accordingly the inner conduit 42 mounted within the conduit 7 is also open at the end nearest the header 6 to permit the free escape of vapors to the header, and a plug 43 similar to the plug 40 is provided to permit the free flow of oil while restricting the flow of vapor, thus causing the vapors to pass out through the inner conduit to the header.

At the opposite ends of the conduits where they enter the connecting elbows, the inner conduits are provided with plugs 44 and 44' similar to plugs 38 and the outer conduits are also provided with plugs 45 similar to plugs 40, thus permitting free flow of liquid oil from one conduit to the next through the elbow, but restricting the flow of vapor.

Thus, it will be observed that each of the main headers serves the two sets of conduits entering it, and it will further be apparent that due to the restrictive action of the plugs, only such vapors as are evolved within these conduits are removed through the header. Due to the arrangement of the baffles as before described the conduits served by each header are included within the same heat area, so that the vapors evolved therefrom are of substantially uniform vaporizing temperature.

If desired the inner conduits may be provided with suitable means to insure their assuming and retaining correct positioning within the outer conduit. In the present embodiment, such means comprise a bar 46 passing through the inner conduits and adapted to cooperate with slots 47 formed in the plugs 40, 43, etc. As will be observed, the engagement between the two serves to hold the inner conduit in its proper position and prevents rotation thereof.

In addition, if found necessary or desirable, the fins 50 may be provided, to aid in preventing sagging of the outer conduits due to the high degree of heat applied particularly in the lower conduits. The inner conduits, of course, are subjected to a less degree of heat than the outer conduits and consequently are less liable to sag, and the provision of the fins 50 permits them to assist in the support of the outer conduits.

As the liquid oil flowing through the outer conduits is subjected to the influence of heat, the vapors from the low boiling point constituents thereof are liberated and in the absence of the froth or foam before referred to will rise toward the top of the conduits and will be drawn through the small perforations 37 into the inner conduits and are thus separated from the liquid oil being subjected to heat. A free passage for the escape of the vapors is provided in the inner conduits 35 and they are rapidly drawn therethrough toward the nearest header having a vapor exit 30 through which the vapors are withdrawn for condensation.

If, at any point in the conduit, due to the application of heat, the oil therein tends to froth and foam, and thus to fill the conduit, a free passage for vapors is still provided through the inner conduits, thus tending to equalize pressures throughout the conduits and preventing objectionable differences of pressure which might otherwise occur if the froth formed an obstruction in the conduits. At the point at which the foaming occurs, however, when the froth rises to the level of the small perforations 37, there will be a tendency to draw the foam and the imprisoned vapors into the inner conduits from the outer conduits. As this takes place the various individual bubbles forming the froth will tend to be broken up by their passage through the small perforations. The liberated vapors, of course, will pass out through the inner conduits in normal fashion. Some of the unvaporized liquid forming the froth will flow down over the sides of the outside of the inner conduits and will drop into the stream of oil in the outer conduits for further treatment. Some of the liquid will be drawn through the perforations with the vapors to form a small stream of oil in the bottom of the inner conduits. This liquid will flow through the passage to the end thereof and will be returned to the main stream at the next elbow or the next header.

It has been an aim in systems of the type herein described to reduce the amount of decomposition, due to the application of heat, to a minimum and it has been sought to accomplish this result by reducing the amount of heat applied by maintaining the system under a high vacuum, and also by withdrawing the liberated vapors as rapidly as practicable in order that they should not be subjected to heat tending to cause decomposition after vaporization. As will be observed in the present apparatus, due to the provision of a separate conduit for the passage of vapors, such conduit being always open for the free passage thereof, the vapors are withdrawn from the system substantially as quickly as they are evolved. It will also be observed that since the vapors are withdrawn from the outer conduits as evolved, and are caused to travel through the inner conduits to the header from which they are removed from the system, they are thereby effectively removed from further heat treatment tending to cause decomposition. As set forth above, the upper side of the outer conduits may in some cases be hotter than the under side where the liquid is absorbing heat. Without the provision of the inner conduit, the vapors would normally have a tendency to rise to the top of the conduit, where the greater degree of heat might have a tendency to cause decomposition. In the present apparatus, however, the vapors are rapidly drawn into the inner conduit in which the temperature is substantially that of the vapors passing therethrough.

Moreover, due to the fact that vapor exits 30 are provided at intervals throughout the system, vapors of oils having substantially the same vaporizing temperature will be collected at each exit. That is, the vapors withdrawn through the vapor exit 30 mounted on the header 6 will be vapors of oils of substantially the same vaporizing temperature, and furthermore these vapors will be vapors of oils having a lower vaporizing temperature than those collected through the vapor exits 30 of the lower headers which have been subjected to a greater degree of heat. So, also, the vapors collected through the vapor exit 30 on the bottom header 13 will be those of oils of a still higher vaporizing temperature, although again the vapors collected through this exit will be those of oils of substantially the same vaporizing temperature. Thus, by providing a sufficient number of conduits, headers, and vapor exits, and by controlling in any desired manner the degree and amount of heat applied to the various conduits, oils of substantially any desired vaporizing temperature may be separated out and collected.

It is to be understood that the invention may be variously modified and embodied within the scope of the subjoined claims.

I claim as my invention:

1. In an apparatus for the continuous distillation of mineral oils under high vacuum, in combination, a conduit inclined to cause flow of liquid therein, an additional conduit fixed within said first named conduit and substantially parallel thereto, said additional conduit having free communication with said first named conduit throughout substantially its entire extent, a header having an opening to receive the lower ends of said conduits, and means adapted to permit free flow of liquid from said first-named conduit to said header, but to prevent flow of vapors to said header except through said second conduit.

2. In an apparatus for the continuous distillation of mineral oils under high vacuum, in combination, a conduit inclined to cause flow of liquid therein, an additional conduit fixed within said first named conduit and adapted to fill a substantial portion of the volume thereof, said additional conduit having free communication with said first named conduit throughout substantially its entire extent, a header having an opening to receive the lower ends of said conduits, and means adapted to permit free flow of liquid from said first-named conduit to said header, but to prevent flow of vapors to said header except through said second conduit.

3. In an apparatus for the continuous distillation of mineral oils under high vacuum, in combination, a conduit inclined to cause flow of liquid therein, an additional conduit fixed within said first named conduit and adapted to fill a substantial portion of the volume, thereof said additional conduit having communication with said first named conduit through a plurality of perforations distributed along its upper side throughout substantially its entire length, a header having an opening to receive the lower ends of said conduits, and means adapted to permit free flow of liquid from said first-named conduit to said header, but to prevent flow of vapors to said header except through said second conduit.

4. Distillation apparatus for high vacuum distillations comprising, in combination, an inclined tubular conduit, and a second conduit within said first conduit, means to admit material to be treated to the bottom of the upper end of said first conduit, means to prevent the admission of said material in liquid form to said second conduit, means providing free communication between said conduits for passage of said material in vapor form, means providing a vapor outlet from said second conduit, and means for restricting the passage of vapor from said first conduit except through said second conduit.

In testimony whereof, I have signed my name to this specification this 10th day of July, 1924.

DAVID T. WILLIAMS.